United States Patent [19]

Sedgewick

[11] Patent Number: 4,509,564
[45] Date of Patent: Apr. 9, 1985

[54] METHOD FOR WINDING ANNULAR ZIG-ZAG WINDINGS

[76] Inventor: Richard D. Sedgewick, 100 Horne St., Dover, N.H. 03820

[21] Appl. No.: 485,737

[22] Filed: Apr. 18, 1983

Related U.S. Application Data

[62] Division of Ser. No. 342,647, Jan. 25, 1982, Pat. No. 4,399,843, which is a division of Ser. No. 198,928, Oct. 20, 1980, Pat. No. 4,331,896.

[51] Int. Cl.³ .............................................. B21F 3/00
[52] U.S. Cl. ................................. 140/92.2; 242/7.03
[58] Field of Search ..................... 140/92.2, 90, 105; 242/7.03, 1.1 R; 72/144; 29/596; 310/198, 207, 205, 184

[56] References Cited

U.S. PATENT DOCUMENTS

| | | | |
|---|---|---|---|
| 3,550,645 | 12/1970 | Keogh | 140/92.2 |
| 3,699,371 | 10/1972 | Henry-Baudot | 310/207 |
| 3,760,851 | 9/1973 | Schmidt et al. | 140/105 |
| 4,351,102 | 9/1982 | Grozinger et al. | 242/1.1 R |

FOREIGN PATENT DOCUMENTS 571043  2/1959  Canada ............................. 140/92.2

*Primary Examiner*—Leon Gilden
*Assistant Examiner*—Linda McLaughlin
*Attorney, Agent, or Firm*—Daniel H. Kane, Jr.

[57] ABSTRACT

Single and multi-phase, multi-pole arrays of adjacent equivalent current loops are formed in a self-supporting structure as wound. The multi-pole windings are formed by zig-zag winding elements having peaks and troughs. The peaks and troughs of each winding element form alternate halves of adjacent effective or equivalent current loops. When the peaks of one winding element are aligned with the troughs of another, the two elements provide a single phase ring of adjacent coupled current loops equivalent to the conventional separately wound coils. However, the current loops are already in a correctly positioned and oriented array as wound. The filaments of one winding element cross over the filaments of another intermediate the peaks and troughs and current passes in one direction through the first element returning in the opposite direction through the second. Multi-phase windings in a variety of configurations are described. The annular windings are wound on an arbor by a new winding apparatus and simplified method according to the disclosure. Windings are removed from the arbor and are particularly applicable for use in sensing and torque producing devices.

6 Claims, 35 Drawing Figures

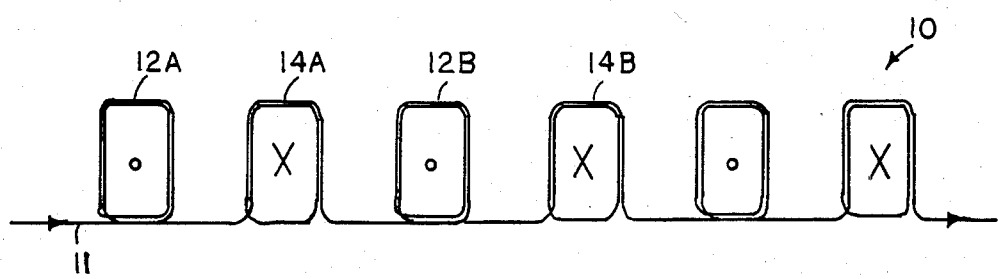
FIG 1A (PRIOR ART)
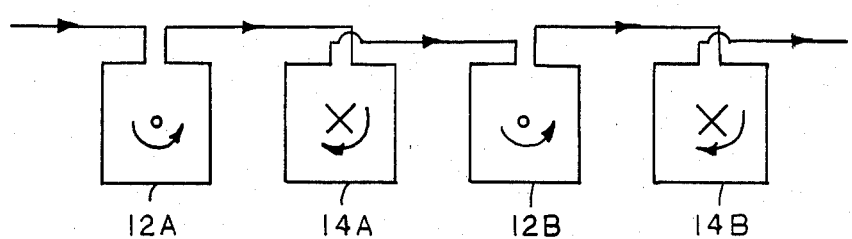
FIG 1B (PRIOR ART)
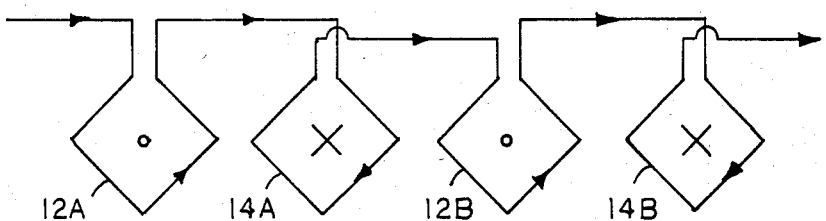
FIG 1C (CONCEPTUAL)

METHOD FOR WINDING ANNULAR ZIG-ZAG WINDINGS

CROSS REFERENCE TO RELATED PATENT AND APPLICATION

This is a division of U.S. patent application Ser. No. 342,647 filed Jan. 25, 1982, now U.S. Pat. No. 4,399,843 issued Aug. 23, 1983, which is in turn a division of U.S. patent application Ser. No. 198,928, filed Oct. 20, 1980, now U.S. Pat. No. 4,331,896, issued May 25, 1982.

FIELD OF THE INVENTION

This invention relates to new and improved windings having adjacent poles, or current loops, arranged in annular configurations and to methods and apparatus for producing such configurations. The windings of the present invention provide multi-pole, single or multi-phase structures, and are particularly applicable for use in sensing or torque producing electromagnetic devices.

BACKGROUND OF INVENTION

Electromagnetic devices usually include electrically conductive windings, wound or assembled in close physical proximity to ferromagnetic materials. The ferromagnetic materials and windings in combination produce directed magnetic paths or circuits suited for particular applications. Applications such as electric motors, solenoids, relays, generators and some sensors contain movable components which are generally referred to as rotors, while the fixed, or non-movable components are known as stators. Stators usually include the non-movable windings and ferromagnetic materials in a configuration to meet the purpose of the device. The present invention is concerned with improvements in such stators.

A conventional prior art stator configuration might include a sequence of individually wound coils, or current loops wound or later positioned in an annular array. Such a series of rectangular loop coils 10 is illustrated in FIG. 1A. FIG. 1A is a diagrammatic representation of only a portion of the windings necessary for establishing the operative magnetic fields in such a conventional device. The coils are wound from a continuous conductive filament one complete coil at a time. The successive coils or current loops are subsequently arranged in an annular or ring configuration and are here shown schematically laid out in a flat array. Successive current loops with multiple turns of wire filament per loop are wound or assembled to afford opposite adjacent polarities so that the radially directed field axes are alternately oppositely directed in and out. Thus, with current flowing in the direction of arrow 11, current loops 12a and 12b establish fields directed out of the plane of the paper while current loops 14a and 14b establish magnetic fields directed into the plane of the paper according to the right hand induction rule. For multiphase stator applications additional identical coil sets would be assembled and appropriately spaced or offset from the first set.

A simplified equivalent circuit of the prior art stationary field windings of FIG. 1A is shown in FIG. 1B where the current is oriented successively in opposite directions around the successive rectangular current loops 12a, 14a, 12b, 14b. The field direction is again shown according to the convention where a dot represents the magnetic field directed out of the plane of the paper and the cross or "x" represents the field directed into the plane of the paper.

A major disadvantage of the conventional construction is that the coil sets must be carefully assembled after the winding step is completed. Thus, the individually wound coils if wound successively from a single wire filament must be oriented properly afterwards. If the coils are wound separately from separate wire filaments, tedious interconnection between the coils is then required with attention again directed to proper orientation. The final assembly must be a supported configuration, with individual coils having the proper relative position and orientation to each other. Winding alone does not result in such final relationship according to conventional methods. The additional handling and manipulation of the coils that is required is undesireable because of the risk of damage to the wire filament as well as the added cost

SUMMARY OF THE INVENTION

It is therefore an object of the present invention to provide a multi-pole, single or multi-phase array of adjacent connected current loops in a self-supporting structure *as wound*. The primary feature and advantage of this winding configuration is that subsequent manipulation to achieve the desired structure is not required. Increased costs of handling, manipulation which would damage filament insulation, and metal fatigue due to unnecessary flexing of the filament is avoided. According to the invention the desired winding configuration is achieved by the winding step alone. The winding is formed by a new winding apparatus and simplified method according to the invention.

Another object of the present invention to provide new and improved coil configurations, particularly suited for motor stator, sensor, and other similar applications, which configurations afford the flexibility and adaptability for multipole single and multiphase requirements, of either concentrated or distributed wire filament arrangements.

A further object of the invention is to provide a variety of coil configurations and methods of winding for multipole single and multiphase applications adapted for providing stationary and moving magnetic fields without mechanical commutation.

To accomplish these results the invention provides a multipole winding formed by zig-zag winding elements having peaks and troughs. The peaks and troughs of each winding element form alternate halves of adjacent effective or equivalent current loops. When the peaks of one zig-zag winding element are aligned with the troughs of another, the two elements provide a ring of adjacent current loops equivalent to the conventional separately wound coils. However, the current loops are already in a correctly positioned and oriented array as wound. The filaments of one winding element cross over the filaments of the other intermediate the peaks and troughs and current passes in one direction through the first element returning in the opposite direction through the second.

Typically, in accordance with the present invention, the shape of a half winding element or half current loop is a triangular form as shown in FIGS. 3A and 3B but other forms or shapes can be used for the zig-zag crossover coil elements such as square, rectangular, trapezoidal and sinusoidal hereafter more fully described. Each of the first and second zig-zag elements may be composed of multiple passes of wire filament either concentrated or distributed as hereafter described. The aligned peaks and troughs of the first and second zig-zag windings in the case of triangular shape form a ring of effective or equivalent current loops of substantially diamond or rhombus shape arranged around an annulus.

The phrase "effective" or "equivalent" current loop is used because the current loop is formed by halves from the two winding elements. The first and second zig-zag winding elements, if formed separately, are electrically joined so that current passes in one direction through the first winding and returns in the opposite direction through the second winding whereby the ring of effective current loops of diamond shape generate magnetic fields of alternately opposite polarity with axes along radial directions in the plane of the annulus. Where different winding shapes are used, the current loops assume correspondingly different configurations, for example rectangular or square.

Where a single phase winding, that is a single pair of winding elements of juxtaposed troughs and peaks is used, the configuration is particularly suited for use as a sensing device or simple torque producing device, for example in gyroscopes. For such applications the phrase "torquer coil" is sometimes used referring to a coil which applies a torque for a purpose which may include measurement or identification of external conditions or forces. Such single phase windings may have a varying number of poles according to the number of troughs and peaks and may be either concentrated in a single bundle of filaments or distributed over a plurality of bundles according to the characteristic requirements of the application.

The invention also contemplates providing multiphase stator windings for application in motors and generators. According to this aspect of the invention the first and second sets of zig-zag winding elements as set forth above comprise a first phase of the stator winding. Third and fourth zig-zag winding elements are formed in the same manner as the first and second winding elements in an annular configuration adjacent to the first and second winding elements but offset from the first and second. Thus the third and fourth zig-zag elements form a second ring of equivalent current loops offset from the first ring for generating magnetic fields of alternately opposite polarity along radial directions of the annulus offset from the fields generated by the first ring of equivalent current loops. Each phase comprises multiple poles and is concentrated in a single filament bundle or distributed in a plurality of spaced apart bundles over a larger area.

A feature and advantage of the present invention as set forth above is that annular zig-zag windings may be combined to provide additional phases, for example three or four phases or more, each formed in the manner of the first and second phases and each phase sequentially offset from adjacent phases around the ring or annulus. Such configurations according to the present invention permit separate and sequential excitation for stepwise changes of magnetic fields around the ring or annulus while the winding itself remains stationary. Sequential excitation may be used in a number of applications requiring incremental motion. To this end the invention provides electronic switches for switching current between successive phases of the stator winding thereby providing a moving magnetic field. The stator winding as so formed may be assembled within or without an adjacent band or cylinder of iron as part of a magnetic circuit or wound directly on such a member.

Furthermore, each phase of windings has multiple poles according to the number of juxtaposed troughs and peaks. And each winding element may be concentrated with the filaments in a single bundle or distributed with filament over a wider area, for example by using multiple bundles per winding element.

While the invention is here generally described with reference to annular winding configurations with offset phases for producing rotary motion and torque, the windings may also be formed with successive phases offset in an axial direction for imparting linear motion or force, for application in, for example, solenoids or other linear positioning devices. Furthermore, the single and multiphase, concentrated or distributed crossover zig-zag windings of the present invention may be wound on a spherical surface or other surface of two dimensional curvature particularly suitable and applicable for scanning motors and sensors. Yet another configuration is an annular winding on the frustrum of a cone.

In order to form the winding configurations as set forth above, the invention further contemplates new and improved methods and apparatus for winding annular zig-zag cross-over windings having a variety of wave-forms including triangular or sawtooth, rectangular, square, etc. According to this aspect of the invention a winding form or arbor of appropriate shape is mounted for rotation about its elongate axis. A plurality of pins is spaced apart around the arbor in at least two opposite rings of pins defining the opposite perimeters of the annular winding to be formed. As the winding arbor is rotating, a wire feed arm mounted for delivering filament wire to the surface of the arbor is reciprocated back and forth across the winding arbor in a span greater than the spaced apart rings of pins mounted in the arbor and in timed relationship to the rotation of the winding arbor. The filament wire is thereby drawn under some tension onto the surface of the arbor in a zig-zag pattern of peaks and troughs held in position by the spaced apart pins arranged around the winding arbor. The reciprocating feed arm guides the wire to pins of alternately opposite rings during winding resulting in the zig-zag configuration.

According to further features the coil winding apparatus includes a reciprocating forward and reversing motor and a spiral cam or lead screw driven by the motor. The wire feed arm is coupled at its end opposite the wire guide head to the spiral cam or lead screw for motion back and forth. In one preferred embodiment the spiral cam or screw comprises a threaded arm or lead screw and a non-rotating nut or threaded sleeve follower on the screw to which the wire guide arm is coupled for translation back and forth with the sleeve follower as the reversing motor rotates the lead screw forward and backward.

In winding a multiphase multi-pole annular zig-zag stator winding according to the invention, a first annular zig-zag winding of troughs and peaks is wound by drawing filament wire onto the surface of the arbor form around spaced apart pins on the winding arbor as the arbor rotates and the guiding arm reciprocates. Tension maintains the wire filament in the acute angles of the arbor pins.

The first zig-zag winding element comprising half of a first phase is generally formed by multiple passes of the guide arm as the arbor rotates providing a first zig-zag winding element of multiple filaments. The triangular edges or other waveform peaks of the zig-zag are rounded as wire builds up at the turns. For winding the second zig-zag winding element in crossover relationship with the first element, the direction of arbor rotation is reversed without parting the filament wire so that current can later pass into the first zig-zag winding element in one direction then return through the second winding element in the opposite direction. The first and second complementary zig-zag winding elements thereby form the first phase of the stator coil.

The filament wire is then parted to provide an electrically isolated first phase winding and the arbor is advanced for winding third and fourth complementary annular zig-zag winding elements in the same manner on different pins. The third and fourth winding elements form a second phase of equivalent current loops. A multiphase stator winding may thereby be accumulated on the winding arbor or form composed of a plurality of electrically isolated winding phases. Furthermore in each phase or stage the winding may be concentrated in a single bundle or distributed over a plurality of smaller bundles. Such distributed windings may afford better use of available space to obtain a greater number of turns for a given annular space according to the coil application.

Finally, the multiple filaments are treated or bonded and the pins withdrawn from the cylindrical arbor. The winding is removed as a self supporting structure, by sliding it off the arbor. Iron or permeable metal may be added subsequently to the winding by placing the winding within or without an adjacent band or cylinder of iron or other permeable metal as part of a magnetic circuit.

A feature and advantage of the apparatus and method for winding zig-zag crossover windings of the present invention as summarized above is that the apparatus and method may be modified for winding conventional non-crossover coil windings all as hereafter described. Such coil windings may also be formed in a self supporting configuration or assembled in other ways.

According to other features of the invention, computor control can be implemented for controlling the elements of the coil winding apparatus and the parameters of each coil winding. Thus, the relative speeds of the two motors, the arbor turning motor and the feed arm reciprocating motor may be program controlled to set the number and spacing of zig-zags per turn of the arbor and the number of turns per complementary zig-zag winding. Indexing or phasing of successive windings may similarly be program controlled. Automated control of tension on the feed wire may provide another important feature of the coil winding apparatus to prevent wire from climbing up the arbor pins as wire builds up at the acute angles of the arbor index pins. Alternatively the parameters of the coil winding may be set by well known techniques including motor controllers, turns, counters, and mechanical programmers.

PRIOR ART STATEMENT

The closest prior art known to the present inventor is found in the patents of Fritz Faulhaber, and in particular U.S. Pat. Nos. 2,999,956; 3,191,081; 3,360,668; 3,467,847; and the Faulhaber et. al. U.S. Pat. No. 3,308,319. The Faulhaber patents generally describe bell-type ironless rotary armatures or rotor coils in contrast with the present invention which is directed to non-moving stator coils. The Faulhaber rotor coil is divided into commutation groups, each occupying a section of the cylinder formed by the coil. During operation all commutation groups are energized and carry current. The direction is switched by contact commutation effected by rotation of the rotor between commutation groups. The angular position of the rotor and brush contact determine the direction of current and the polarity of the entire rotor.

On the other hand, the present invention contemplates a stator coil or stationary coil in which the radial directions of the magnetic field are changed by excitation of different phases by electronic switching without interconnected commutation groups. There is no mechanical commutation and each phase extends 360° around the ring or coil annulus. Each phase comprising a complementary pair of zig-zag windings with approximately aligned troughs and peaks provides an even number of poles around the coil in contrast to the odd number of commutation sections of Faulhaber which afford excitation at any time in only a single direction of the circular coil. In the present invention there is no shaft and there is no mechanical commutator.

More importantly, Faulhaber coils do not provide functional current loops around an annulus nor incorporate the "phase" concept as provided by the present invention. According to Faulhaber's coil structure there are no complementary zig-zag winding elements forming the complementary halves of a ring of current loops as taught and claimed in the present patent application. The noticeable geometrical configuration identified in the Faulhaber winding and claimed in U.S. Pat. No. 3,360,668 is the isosceles triangle configuration. On the other hand, according to the present invention diamond shaped equivalent current loops are arranged around an annulus or ring with orthogonal axes through each current loop lying along the radii of the annulus. These effective current loops are formed by complementary pairs of zig-zag winding elements as described above.

Looking in more detail at the structure and function of the Faulhaber coil it is important to note that the Faulhaber coil structure involves turns of wire "extending in skewed relation to the rotor axis from one axial side of the armature to the other along a portion of the periphery." As described and claimed in Faulhaber U.S. Pat. Nos. 3,191,081 and 3,360,668 the successive turns of wire on the Faulhaber coil form a helix or helical winding. As further illustrated in FIG. 2A, a single turn 16 of the Faulhaber coil extends from one side of the coil to the other and overall 360° around the coil. If the successive helical turns 16 of a Faulhaber commutation group as illustrated in FIG. 2B, were viewed as current loops, the magnetic field axes 17 generated by the group of successive turns do not fall along radial lines of the coil but rather are skewed significantly to an angle between the radial and axial lines of the coil. As further taught in Faulhaber U.S. Pat. No. 3,191,081 the effective components of the fields generated by current passing in the coil are produced by the vertically directed resultants of current movement in the core windings. Vertical current zones are the effective current flow as shown in Faulhaber U.S. Pat. No. 3,191,081, FIGS. 7 and 8 rather than the current loops of the present invention.

The magnetic field axis generated by current passing in the winding elements of the present invention fall along the radial lines of the annulus or ring. The effective current movement in the coils of the present invention are the loop currents or equivalent circular currents resulting from the complementary pairs of zig-zag windings rather than the vertical resultants as in Faulhaber. In summary, the structure and functions of the Sedgewick zig-zag wound annular stationary coil configurations of the present invention differ significantly from the Faulhaber helically wound commutating and rotating coils.

Furthermore, the present invention is applicable for imparting not only rotational motion, but also linear motion. For producing linear motion the annular phases or windings of the present invention are offset from each other in an axial direction for producing motion of, for example, an armature, in the direction of the offset annular phases. Because the Faulhaber coils do not embody the 360° phase concept, such axial offset linear producing configuration would not be possible.

Other objects features and advantages of the present invention will become apparent in the following specification and accompanying drawings.

BRIEF DESCRIPTION OF THE DRAWINGS

FIG. 1A is a schematic view of a set of prior art rectangular stack windings shown in a flat array and suitable for placement around pole pieces defined by conventional radial stack slots.

FIG. 1B is a schematic diagram of an equivalent circuit for the set of prior art rectangular stack slot windings.

FIG. 1C is another schematic diagram of the equivalent circuit of rectangular stack windings with the rectangles rotated to provide a first step in conceptualization of the present invention.

FIG. 6 is a perspective of a single phase annular zig-zag winding in accordance with the present invention while

FIG. 13B is a diagrammatic cross sectional side view of the winding apparatus along the line B—B of FIG. 13.

DESCRIPTION OF THE PREFERRED EXAMPLE EMBODIMENTS

Figure 2A:
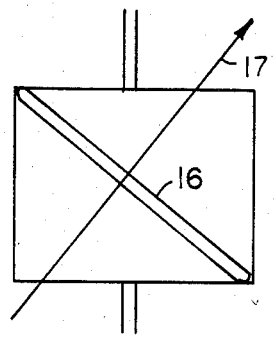
FIG. 2A is a fragmentary schematic detail of a single turn of the helical winding in the prior art Faulhaber coil described in U.S. Pat. No. 3,360,668.
Figure 2B:
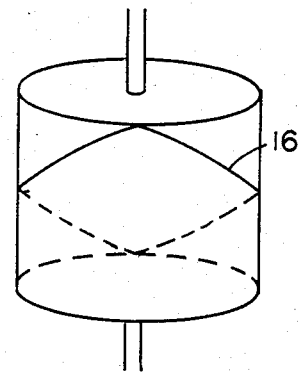
FIG. 2B is another fragmentary schematic detail in perspective of a single turn of the prior art Faulhaber helical winding, part of a commutation sector of the coil.
Figure 3A:
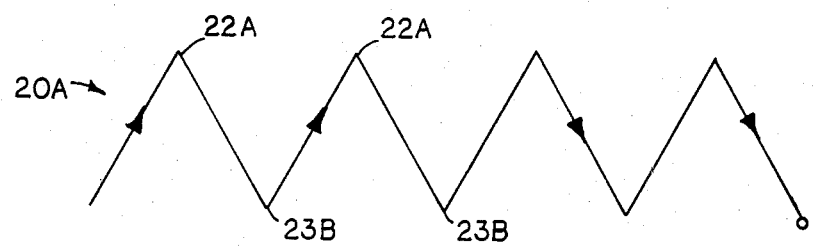
FIG. 3A. is a schematic diagram of a portion of a first zig-zag winding forming one half of a phase in accordance with the present invention.
Figure 3B:
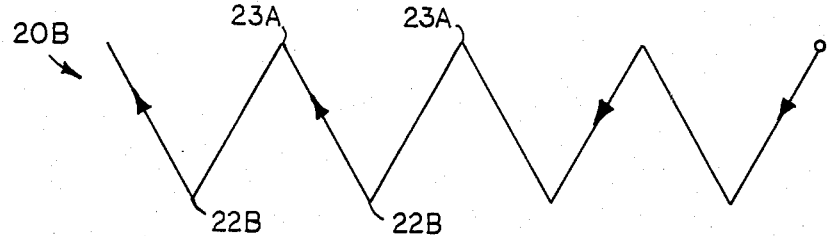
FIG. 3B is a schematic diagram of a portion of a second zig-zag winding element offset from the first winding element of FIG. 3A and aligned so that the troughs of the second winding element fall beneath the peaks of the first.

In FIGS. 3-10 are illustrated a variety of zig-zag crossover configurations in accordance with the present invention, incorporating triangular winding elements or components as shown in FIGS. 3A and 3B which might also be characterized as "sawtooth" or equilateral sawtooth in "waveform". The triangular winding element 20A shown in FIG. 3A consists of sawtooth or triangular peaks 22A and troughs or valleys 23B, and generally consists of a plurality of wire filaments in a bundle wound around pins as hereafter described. The winding is here shown diagrammatically as a single line representing such a bundle. Winding element 20A represents half of a functional coil winding phase of the present invention. The other half is represented by the triangular or sawtooth winding element 20B of FIG. 3B similarly consisting of sawtooth or triangular peaks 23A and troughs or valleys 22B. The electric current direction in each of the winding elements is represented by arrows.

Figure 4:
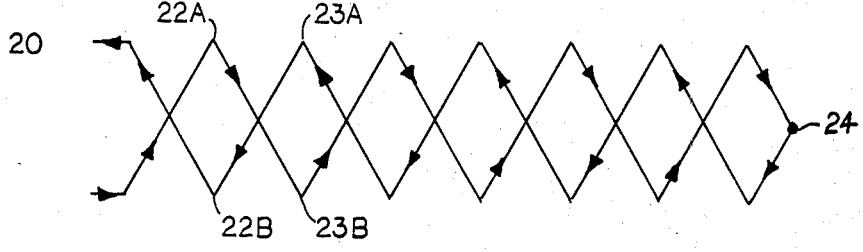
FIG. 4 is a schematic diagram of a single phase coil comprised of the two half windings of FIGS. 3A and 3B in crossover relationship and electrically connected so that electrical current passes in one direction in the first zig-zag winding element and returns in the other direction in the second zig-zag winding element.

The two winding elements or halves 20A and 20B are combined in overlapping or crossover relationship to form the single winding 20 shown in FIG. 4. In this single phase 20 the peaks 22A of coil element 20B are approximately aligned with the troughs 22B of winding element 20B while the peaks 23A of winding element 20B are generally aligned with the troughs 23B of winding element 20A. Winding elements 20A and 20B are electrically coupled as at 24 so that the current passes through one of the elements, for example 20A in one direction and returns in the other winding element 20B in the opposing direction. For multi-filament winding bundles this electrical coupling is effected by a single filament, winding the half phase or element 20B, for example, in the opposite direction as a continuation from the half phase or element 20A as hereafter more fully appears.

Figure 4A:
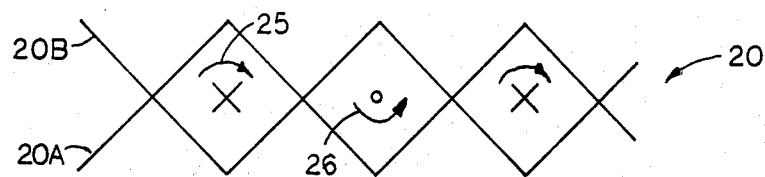
FIG. 4A is a detailed portion of the schematic diagram of FIG. 4 showing the equivalent current loops of rhombus configuration and the magnetic field axes according to the right hand rule.

As shown in more detail in FIG. 4A the single phase or stage winding 20 when excited with electric current passing in one direction through one half element and returning in the other direction through the other half element produces a row or sequence of effective or equivalent current loops represented by arrows 25 and 26 with current flowing in alternately opposite directions in successive equivalent current loops. Thus, tracing the actual current through the winding filament paths 20A and 20B indicates that the effective or equivalent current loop 25 has a current flow in the opposite direction from the next adjacent current loop 26 etc. The alternately oppositely flowing equivalent current loops generate alternately opposite magnetic field directions or poles in directions orthogonal to the plane of the respective current loops represented by X's and dots at the center of each current loop according to the convention that X's represent field lines going into the plane of the current loop and the plane of the paper and points or dots represent field lines coming out of the plane of the paper and current loop. The end result is a sequence of equivalent current loops generating magnetic fields of alternately opposite polarity yet without the necessity of winding and providing individual coils as required in the prior art windings such as illustrated in FIG. 1A.

Figure 5:
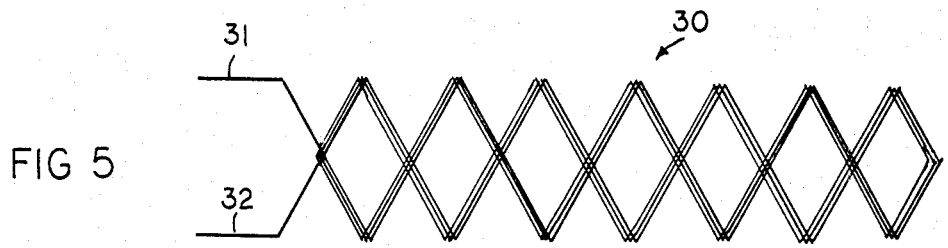
FIG. 5 is a diagram of a portion of multifilament zig-zag winding according to the present invention with two half windings assembled for a single phase.

A single phase zig-zag crossover winding 30 constructed in accordance with these principles is illustrated in FIG. 5. The half phases or elements of the winding consist of multi-filament bundles with single filament leads 31 and 32. Thus, current enters at lead 31, travels in one direction down a filament of the first saw-tooth wave form element or half phase and returns in the opposite direction down the other saw-tooth waveform element or half phase, then going back and forth through all the winding filaments until finally exiting through filament lead 32. Such a linear zig-zag crossover winding in accordance with the present invention may be viewed as a portion of an annular winding. While it is illustrated above with reference to use with saw-tooth waveforms, other waveform windings such as rectangular, square, trapezoidal and sinusoidal may also be used such as illustrated for example in FIGS. 17 and 18 hereafter described.

Figure 6:
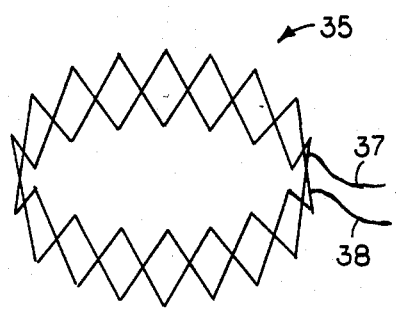
Figure 7:
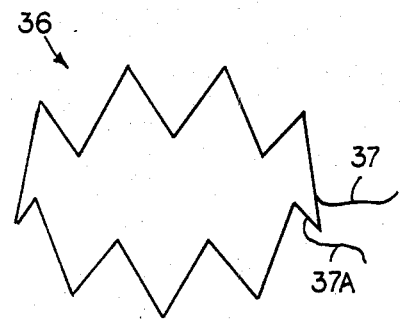
FIG. 7 represents a perspective view of one complementary half of such an annular zig-zag winding. In each case the single line represents many filament

The single phase zig-zag crossover winding is applied in an annular configuration 35 in the example of FIG. 6. This annular zig-zag winding is similarly composed of two half phases or winding elements 36 as shown in FIG. 7. In both illustrations the single lines of the winding represent multi-filment bundles. The saw-tooth waveform winding element 36 has filament leads 37 and 37A from the multi-filament winding bundle. Winding element 36 is fitted adjacent to a second similar element such that the peaks of one element substantially coincide with the troughs of the other element. Then a lead from one element is coupled to a lead from the other element so that current passes in one direction sequentially through the filaments of that element and then return in the opposite direction sequentially through the filaments of the second element. This affords the sequence of equivalent current loops now arranged in an annular ring and with the effective loop currents directed in alternately opposite directions generating radial magnetic fields of alternatively opposite polarity. Thus the magnetic field lines extend through the plane of each loop comprising radial directions of the annular ring and in alternatively opposite directions. Annular winding 35 thus represents a single phase multi-pole concentrated winding, that is with the filaments of the single phase concentrated in a single bundle of filaments. Current entering for example at lead 37 of coil 35 passes in one direction through the filaments of the first saw-tooth wave form element and in the opposite direction through the filaments of the second saw-tooth wave form element before exiting at lead 38.

Figure 8:
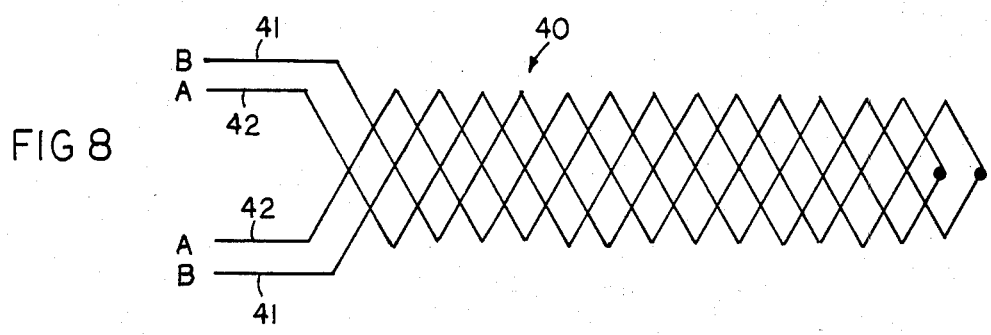
FIG. 8 is a diagrammatic view from the side of a two phase winding in accordance with the present invention.
Figure 9:
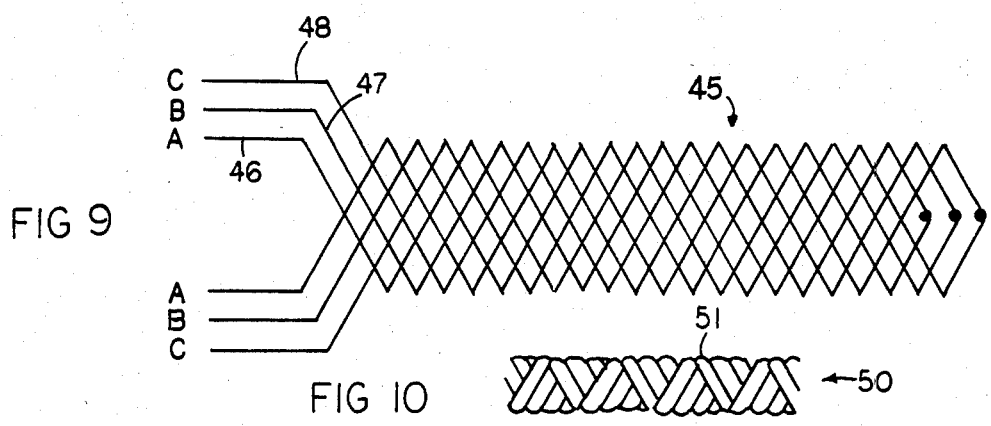
FIG. 9 is a diagrammatic view from the side of a three phase winding in accordance with the present invention.
Figure 10:
FIG. 10 is a diagrammatic view of a fragmentary portion of a multiphase winding in accordance with the present invention.

Portions of different multi-phase zig-zag winding configurations in accordance with present invention are illustrated in FIGS. 8-10. A two phase multi-pole zig-zag crossover winding is shown in FIG. 8 which may be viewed as a portion of an annular coil rendered in a flat plane. The two phase multi-pole winding 40 consists of two phases or stages 41 and 42 each constructed in the manner described with reference to FIGS. 4, 5, and 6.

The two phases 41 and 42 are wound or fitted adjacent to each other but offset in annular spacing in phase by the distance spacing so that the respective equivalent current loops and generated magnetic field poles are similarly offset in phase. The leads A for the phase 42 and the leads B for the phase 41 may be separately excited for alternating the magnetic fields. Thus, the magnetic field poles generated by the equivalent current loops may be sequenced around an annular ring or along a linear array.

A three phase multi-pole zig-zag crossover winding configuration is shown in FIG. 9 which again may be viewed as a portion of an annular winding such as illustrated for the single phase winding in FIG. 6. Separate leads A, B, and C are provided for each of the separate and complete phases 46, 47, and 48 of the three phase winding 45. Current may be successively switched, as for example, by electronic switching between the leads for sequentially exciting the three phases and translating the magnetic fields around the annulus or along a linear array.

A section of a four phase annular zig-zag crossover winding 50 is illustrated in FIG. 10. While some of the sawtooth waveform winding elements or half phases are not visible each such winding element or half phase comprises a bundle of filaments 51 wound successively around an annular winding arbor according to the method of the invention hereafter described. Each phase of the winding includes two of the elements or half phases 51 arranged so that the peaks of one element are substantially aligned with the troughs of the other. Each phase is provided with separate lead wires for separate excitation with electric current for generating magnetic poles around the annulus or ring.

Figure 11:
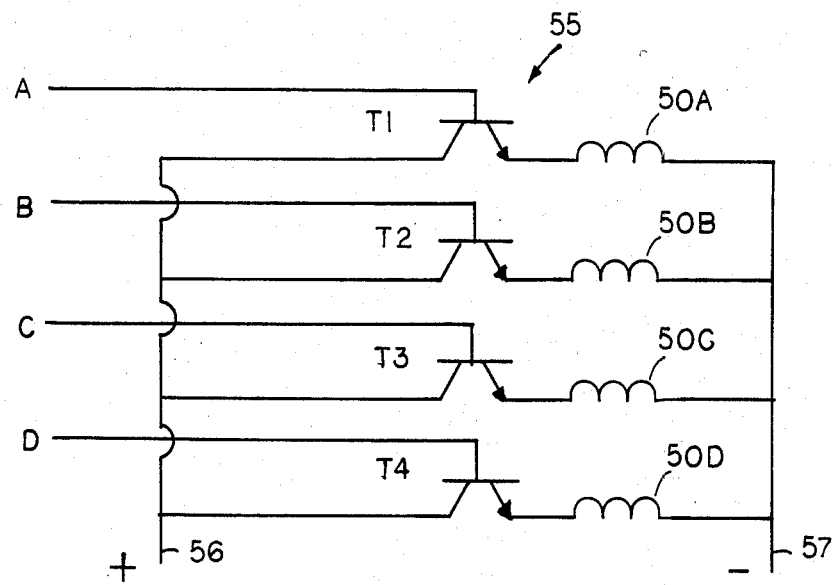
FIG. 11 is a schematic diagram for an electronic switching circuit for successively switching or activating the phases of a four phase winding in accordance with the present invention.

A circuit arrangement for electronically switching electric current sequentially to four phases of a multi-phase annular zig-zag winding of the present invention is illustrated in FIG. 11. As shown in this schematic diagram amounting to an electronic switching circuit 55 the current through leads 56 and 57 from a source not shown is gated by four transistors T1, T2, T3, and T4. Each one of the parallel transistors is coupled in series with one of the phases 50A, 50B, 50C, and 50D. Each of the transistors T1 through T4 is in turn controlled by a gating signal along one of the lines A, B, C, or D connected respectively to the bases of the transistor. Thus a gating signal on line A would permit sourcing current through the first phase 50A. A gating signal on line B would permit sourcing current through the second phase 50B etc. In this manner current can be successively and sequentially sourced to the successive phases of the multiphase winding for translation of the multipole magnetic field.

Figure 12:
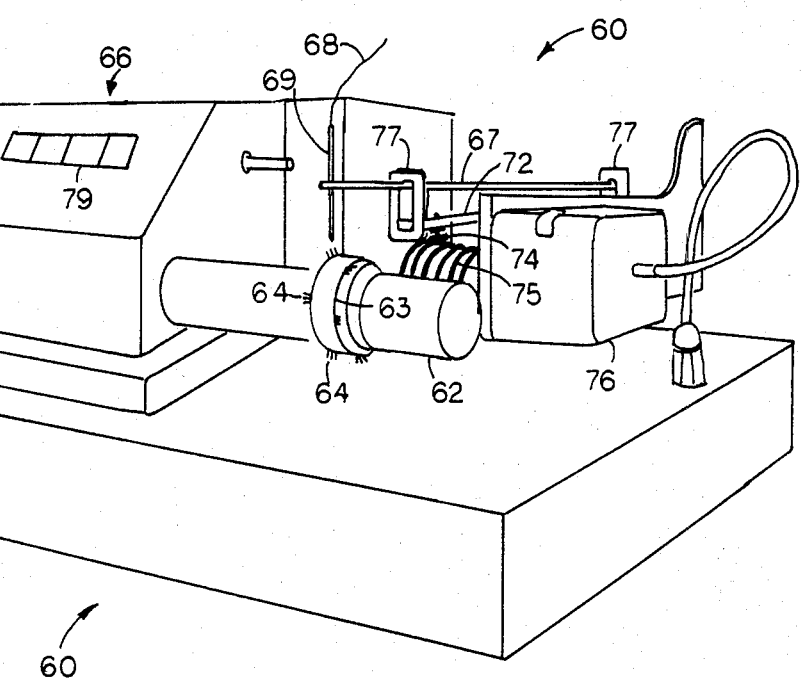
FIG. 12 is a diagrammatic perspective view of the winding apparatus embodying the present invention.
Figure 12A:
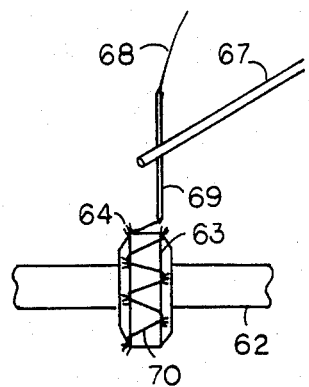
FIG. 12A is a detail diagrammatic view from the front of the winding arbor and wire feed arm of FIG. 12 showing build up of a sawtooth zig-zag winding on the pins of the arbor.

A winding apparatus for winding annular zig-zag crossover windings of the kind described with reference to FIGS. 1-10 is illustrated in FIG. 12. An important feature of this winding machine 60 is the winding arbor 62 of generally cylindrical configuration as shown in further detail from the front in FIG. 12A. In this example the cylindrical arbor 62 includes a raised portion 63 on which are mounted winding pins 64. The pins 64 are clustered in groups along opposite sides of the raised surface of revolution 63 with opposing clusters offset from each other in alignment. In this example the number of pins per cluster represents the number of phases which may be wound in the annular zig-zag winding configuration around the rotating arbor. As the arbor rotates under control of the motor and indexer unit 66 a wire feeding and guiding arm 67 reciprocates back and forth in a sweep wider than the spacing of opposing pins 64 for laying wire under slight tension around the arbor pin in an annular zig-zag configuration. The copper wire filament 68 from a source above not shown is drawn through the wire filament feed needle 69 on to the arbor forming the winding 70 as shown.

The wire feed arm 67 is swept back and forth by guide arm 72 which rotates back and forth on a pivot 73. The guide arm 72 has depending from it a cam follower 74 which rests upon and within the threads of a spiral cam 75 which is reciprocated back and forth by reversing motor 76. Thus, as motor 76 reverses the direction of drive and rotation of the spiral cam 75, the cam follower 74 is pushed back and forth in the axial directron of the spiral cam pushing the guide arm 72 back and forth on its pivot 73. The guides 77 fixed to guide arm 72 in turn sweep the wire feed arm 67 back and forth for delivering copper wire filament 68 in a zig-zag fashion around the pins of the winding arbor. According to one example, the spiral cam comprises a large spring coupled to the reversng motor for reciprocating rotation.

The pins 64 on the projecting surface of revolution 63 of cylindrical arbor 62 are angled from the vertical away from the center of the arbor surface forming an acute angle with the horizontal in the direction away from the winding. This arrangement is advantageous in retaining and packing the wire filament strands laid down under some tension by the feed arm 67 and needle 69 in the apex of the acute angle formed by the pins.

The particular configuration of the element wound on the arbor is a function of a number of parameters such as the speed of rotation of the arbor 62 driven by indexing motor 66 and the speed of reciprocation of the wire feed arm 67 and needle 69 driven by reversing motor 76. For example, the parameters may be set for zig-zag winding around the first pin only of each cluster of pins on the arbor surface with multiple passes to accumulate a concentrated bundle of filaments amounting to a sawtooth wave form zig-zag winding element or half phase. When this is completed the index of motor 66 may be set to wind the other half phase or matched winding element, aligned with the peaks substantially coinciding with the troughs of the first winding element. Or, the index may be set to wind a second phase element for example on the second pin of each cluster of pins on the surface of the arbor. Arbor motor 66 not shown and reversing feed arm motor 76 may thus be controlled and coordinated for winding any of a plurality of possible annular zig-zag winding parameters and characteristics including multi-pole windings of a range of numbers of poles, multiphase windings over a range of number of phases, and concentrated or distributed windings for each winding element. Pulley and belt 78 coupled to arbor 62 are driven by the arbor motor, not visible.

The latter distinction between concentrated and distributed windings is as follows. In a concentrated winding the multiple filaments of a single winding element for a single phase are concentrated in one bundle around one set of pins. In a distributed winding the multiple filaments of a single winding element for a single phase are distributed among a plurality of adjacent bundles over a plurality of sets of pins thereby distributing the copper over a wider area. This is advantageous in achieving a better physical distribution of copper wire for certain applications.

Such varied control of the parameters of the coil winding machine for deriving coils of different parameters and characteristics may be manual, that is manually set for each particular winding task. On the other hand, the motors 66 and 76 may be placed under the control of a microprocessor programmed to receive indexing instructions according to the requirements for each winding to be wound. Indexing information for the arbor appears at the display 79.

It should be noted that while the foregoing examples have been presented with reference to windings formed with triangular or sawtooth waveforms, the winding machine 60 is adapted to winding elements of a variety of waveforms including square, rectangular, trapezoidal, sinusoidal, etc. To achieve a rectangular, square or trapezoidal waveform for example, the residence time of wire feed arm 67 and needle 69 at the outer limits of the reciprocal sweeps is increased. As a result arbor 62 turns a sufficient angular distance so that upon return of the arm 67, wire 68 is laid under a second pin 64 on the same side of the arbor and a winding of the type shown in FIGS. 17 or 18 as hereafter described is formed. When a pair of such waveform winding elements are combined to provide a single phase with the peaks of one element substantially coinciding with the troughs of the other element, equivalent current loops are formed with shapes other than diamond as heretofore described. Thus, in addition to the diamond or more general rhombus shaped equivalent or effective current loops described in the previous examples, the present invention contemplates rows, annular rings, and sequences of equivalent current loops of square, rectangular, trapezoidal and double sinusoidal form and other shapes. Such shapes are determined by the selected waveform which the parameters of the winding machine are preset and adapted to wind, and the pin positioning.

Figure 13A:
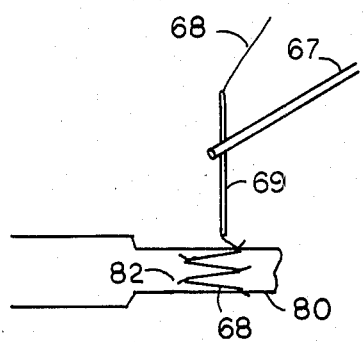
FIG. 13A is a detail diagrammatic view from the front of the winding arbor and wire feed arm for the apparatus of FIG. 13 showing build up of a sawtooth zig-zag winding on the pins of the arbor.
Figure 13:
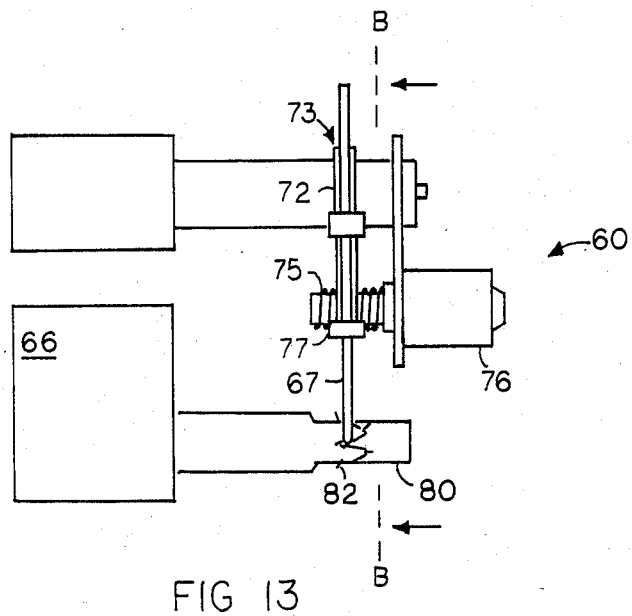
FIG. 13 is a detail diagrammatic plan view of another winding apparatus and associated motor, counter and indexer but with a different shape arbor.
Figure 13:
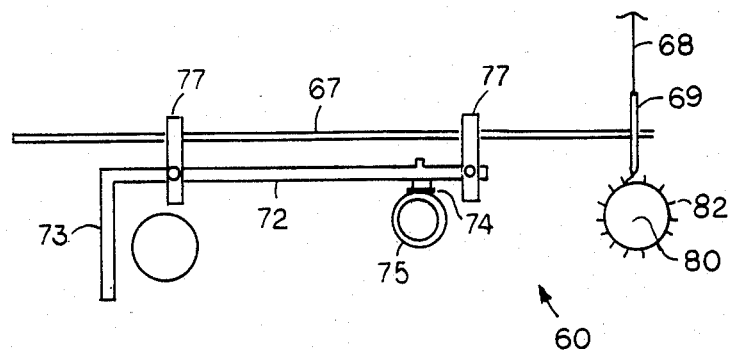

Further illustration of the winding apparatus is shown in FIGS. 13, 13A and 13B where elements corresponding to those denoted in FIG. 12 are similarly numbered. In this example a different shape winding arbor 80 is utilized, the functional portion of which is a straight cylindrical surface upon which the winding pins 82 are supported at acute angles to the cylindrical arbor surface with the acute angle of each pin facing in the direction away from the winding thereby to retain and constrain the filaments into a bundle in the apex of the acute angle as the filament 68 is laid in a zig-zag configuration by the wire feed arm 67 and needle 69. FIG. 13B provides a side cross section of the portion of the machine in the direction of the arrows on the line B-B of FIG. 13 while FIG. 13A provides a detail of the zig-zag laying of wire filament on the arbor 80 and acute angle pins 82.

Figure 14:
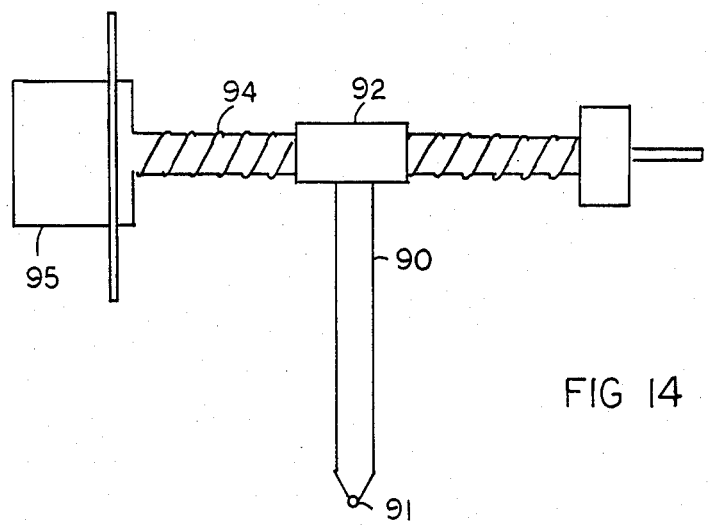
FIG. 14 is a diagrammatic plan view of another preferred example of the wire feed arm and reciprocating transport mechanism using a threaded arm and sleeve follower.
Figure 14A:
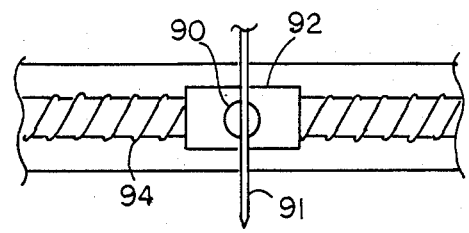
FIG. 14A is a detailed fragmentary view from the front of the mechanism of FIG. 14.
Figure 14C:
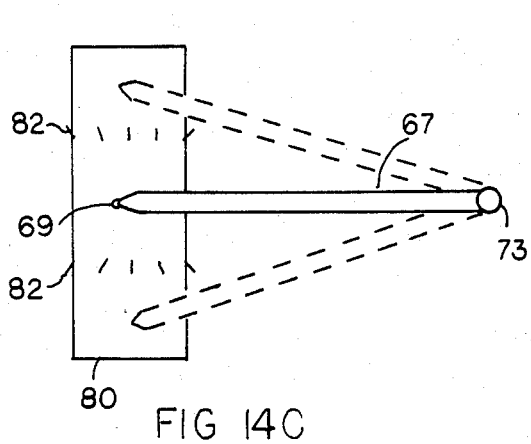
FIG. 14C is a functional diagrammatic plan view showing the feed arm mechanism of the kind used in the embodiments of FIGS. 12 and 13 which effects reciprocation of the feed wire back and forth by pivoting on a pivot point.

The principle of the pivoting wire feed mechanism is shown diagrammatically in FIG. 14C. According to the pivoting feed arm mechanism used in the example of FIGS. 12 and 13 the wire feed pivot arm 67 supporting a wire feed needle 69 sweeps the wire filament back and forth a distance greater than that separating opposing pins 82 on arbor 80 by pivoting on a pivot point 73 as shown diagrammatically in FIG. 14C.

Figure 14B:
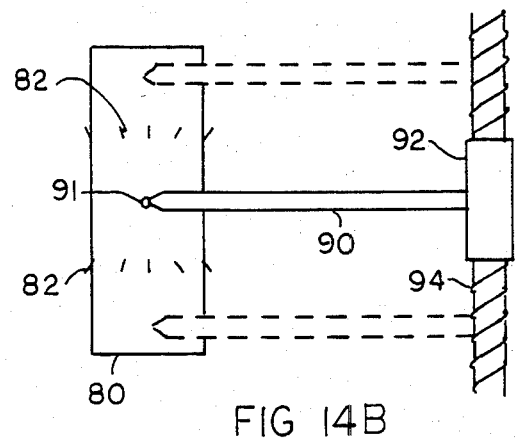
FIG. 14B is a functional diagrammatic plan view showing the feed arm mechanism of the kind used in the embodiment of FIG. 14 which effects reciprocation of the feed wire back and forth by linear translation back and forth on a threaded arm.

According to an alternative preferred arrangement shown in FIGS. 14, 14A and 14B the wire feed arm 90 supporting a wire feed needle 91 is fixed to a threaded sleeve in turn mounted on a threaded arm or lead screw 94. Upon rotation of the lead screw 94 under control of the reversing motor 95 threaded sleeve 92 functions as a sleeve follower translating back and forth with the wire feed arm 90. As a result the wire winding filament is swept back and forth a distance greater than the separation between opposing rows of pins 82 of winding arbor 80 by linear translation back and forth rather than pivotal swinging.

Figure 15:
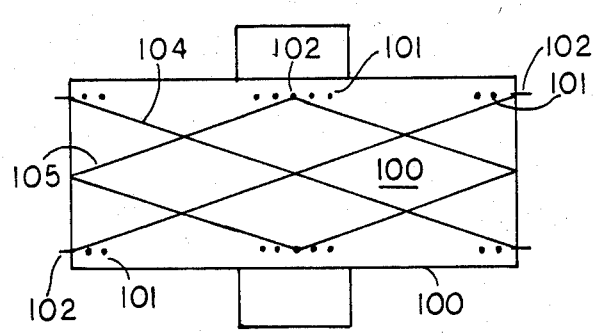
FIG. 15 is a perspective view of a wide diameter winding arbor for greater distribution of the copper filament, with a two phase, two pole per phase configuration wound on the pins of the arbor.
Figure 15A:
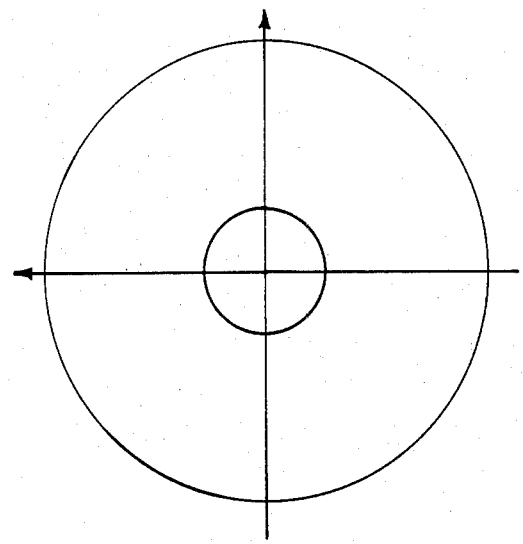
FIG. 15A is a plan view of the arbor of FIG. 15 showing the two pole directions generated by the functional current loops of the distributed zig-zag winding.

As mentioned above the present invention contemplates providing a variety of winding configurations. In FIG. 15 there is illustrated a two phase two pole zig-zag crossover winding distributed over a broader diameter winding arbor 100. This arbor is adapted to provide distributed winding of each phase if so desired. Thus, holes 101 are provided to accomodate up to five pins in a cluster that is four pins in addition to the single pin 102 shown in the middle of each cluster of FIG. 15. With additional pins, the multiple filaments comprising each phase and the pair of elements for each phase may be distributed over a plurality of bundles rather than being concentrated in a single bundle. Thus, the arbor 100 of FIGS. 15 and 15A not only provides equivalent current loops of a very flattened rhombus configuration but also permits distributed winding of the copper in each phase 104 and 105 rather than the single bundle as shown. The multiple adjacent bundles of copper filaments representing a single phase or winding element of a phase may be electrically coupled in series for passing current in the same direction with a single pair of leads for the multiple bundles. The axial view of arbor 100 in FIG. 15A shows the primary polar direction of the two poles of the winding which may be translated around by alternately exciting with electricity the two phases 104 and 105.

Figure 16:
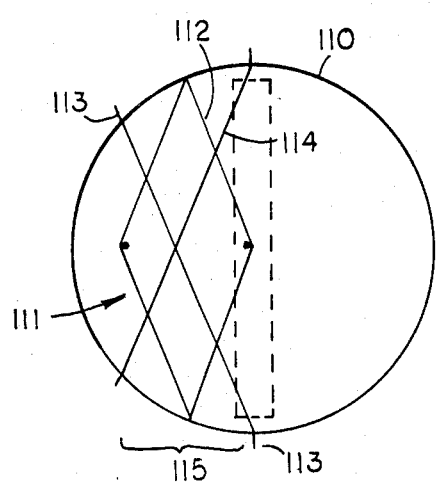
FIG. 16 is a side view of an annular zig-zag crossover winding with two phases and two poles per phase wound on a spherical winding arbor or surface.

Yet another variation of the annular zig-zag winding of the present invention is shown in FIG. 16 where the winding arbor 110 is the surface of a sphere or a surface of compound curvature with pins 113 and the annular winding 111 comprised of two phases 112 and 114 each generating two poles conforms to a band 115 of the spherical surface or surface of compound curvature of arbor 110. For winding on arbors of compound curvature such as a spherical surface, an additional degree of motion is provided in the winding arm to maintain spaced relationship between the needle and arbor surface.

Figure 17:
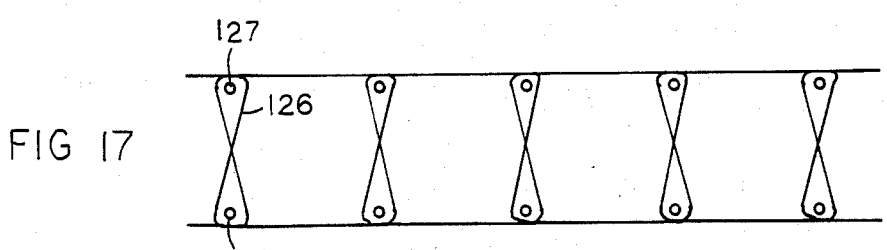
FIG. 17 is a schematic diagram of a zig-zag crossover winding in accordance with the present invention using rectangular or trapezoidal wave forms in combination forming substantially rectangular equivalent current loops.
Figure 18:
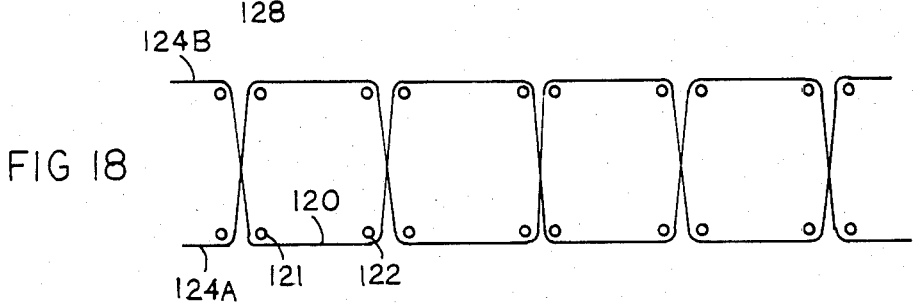
FIG. 18 is a schematic diagram of another zig-zag crossover winding in accordance with the present invention using rectangular, trapezoidal or square wave forms.

Alternative waveform winding elements for the zig-zag crossover windings are illustrated in FIGS. 17 and 18 where generally rectangular or trapezoidal waveforms are shown. In the example of FIG. 18, the coil winding apparatus 60 of FIG. 12 is controlled and adjusted so that the zig-zag sweep of filament wire 120 during wire passes over two pins 121 and 122 to provide the rectangular, square or trapezoidal waveform for each half phase or winding element 124a and 124b. In the example of FIG. 17, the wire feeding arm must take a "step backward" during each pass so that the wire filament 126 passes in front of the pin 127 on one side of the arbor but passes behind the opposing pin 128 on the other side of the arbor so that there is crossover of the wires of paired winding elements or half phases between opposing pins. This crossover of wires of paired elements between opposing pins is alternately in the opposite sense as shown in FIG. 17. To accomplish the "back step" at each sweep of the wire feed arm 67 of apparatus 60, the arbor turning motor 66 must be a reversible.

Figure 19:
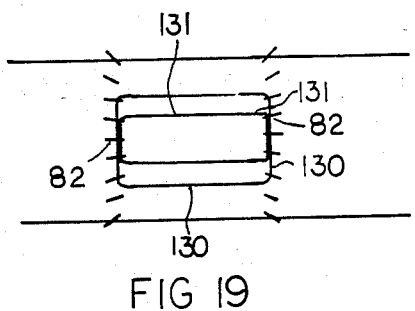
FIG. 19 is a schematic diagram from the side of a winding arbor with concentric loop windings rather than zig-zag windings wound by the apparatus of the present invention representing the beginning of a self supporting winding of adjacent concentric loops.
Figure 20:
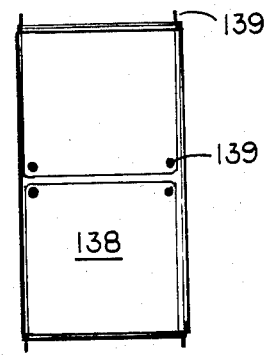
FIG. 20 is a schematic diagram from the front of another winding of overlapping loops wound on an arbor by the winding apparatus of the present invention winding in accordance with a loop winding mode rather than a zig-zag crossover mode.

The versatility of the winding apparatus of the present invention is further demonstrated by the loop winding examples of FIGS. 19 and 20. These represent two different non-crossover, non-zig-zag windings which the winding apparatus is also capable of forming. For winding concentric loop windings 130 and 131 on the opposing pins 82 of arbor 80, the arbor 66 of FIG. 13 must perform reversing steps while the wire feed arm mechanism sweeps across the arbor and the pins. Thus, to form loop windings the wire feed arm reversing motor 76 reciprocates back and forth while the arbor motor also reciprocates back and forth all in timed relationship and under controls to achieve the desired loop configurations laid down in multifilament bundles on the arbor.

Figure 20A:
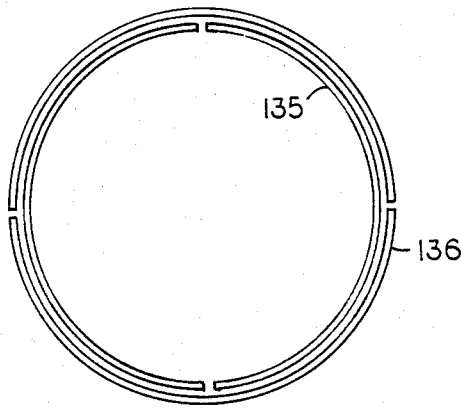
FIG. 20A is a schematic representation from the end of the winding of overlapping loops shown in FIG. 20.

In FIGS. 20 and 20A loop configuration coil windings with much wider or broader loops 135 and 136 are shown wound upon the wide diameter arbor 138 with pins 139. Such winding is accomplished according to the apparatus and method of the present invention by reciprocating motion of the arbor rotating motor 66 of FIG. 13 at the same time that the wire feed arm reciprocally sweeps back and forth across the pins under the impetus of the reciprocating reversing motor 76.

Figure 21:
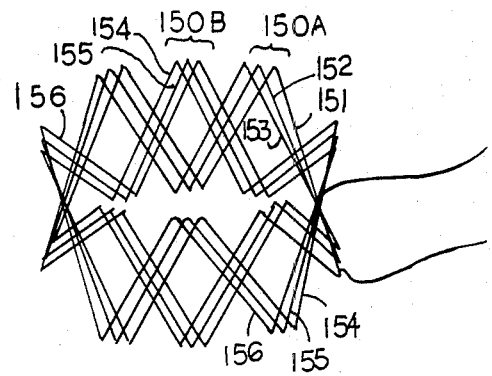
FIG. 21 is a schematic diagram of a single phase zig-zag crossover winding in accordance with the present invention with the single phase winding copper filament distributed over three pin groups forming three offset distributed bundles. Each line represents a bundle of filament except the lead wires.
Figure 22:
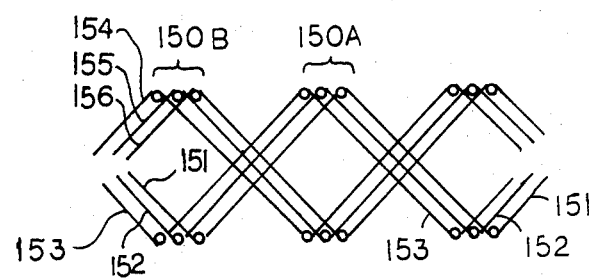
FIG. 22 is a diagrammatic detail of the multipole single phase annular zig-zag crossover winding of FIG. 21 with the copper filament distributed over three bundles.

A final example of an annular zig-zag crossover winding of the present invention is shown in FIGS. 21 and 22. This is a single phase multi-pole winding 150 with distributed winding in the sense that and the pair of winding elements 150A and 150B comprising the single phase are each composed and wound not as a single concentrated bundle but as a distributed set of three bundles 151, 152, and 153. This type of distributed winding is not to be confused with the multi-phase coils also contemplated by the present invention and described earlier with reference particularly to FIGS. 8, 9, 10, and 15. Rather the distributed bundles 151, 152, and 153 of one winding element, for example 150A, are coupled in series as are the distributed bundles 154, 155, and 156 of the paired winding element 150B. These are in turn connected so that the current passes in the same direction through the bundles 151, 152, and 153 of the first winding element 150A and return in the opposite direction through the bundles 154, 155 and 156 of the second winding element 150B. The winding 150 of FIG. 21 illustrates a multi-pole single phase distributed winding while FIG. 22 represents a fragment thereof or a single phase distributed winding.

It is apparent that the annular and linear zig-zag crossover windings of the present invention may assume a variety of configurations and that the method and apparatus for forming such windings are also variable within a range of parameters to achieve the results contemplated by the invention and the following claims.

I claim:

1. A method of winding multi-phase annular zig-zag windings comprising:
rotating a winding arbor having a winding surface for receiving coil forming wire in an annulus around the rotating arbor and a plurality of pins spaced apart around the arbor in at least two opposite rings of pins defining the opposite perimeters of the annular winding to be wound, said pins mounted in the winding arbor forming acute angles with the winding surface of the arbor, each ring of pins oriented with the acute angles in the direction away from the other ring of pins;
reciprocating back and forth a wire feed winding arm over the winding surface in a span greater than the spaced apart rings of pins and delivering coil winding wire to the winding surface in timed relationship to the rotation of the winding arbor;
winding a first annular zig-zag winding element of a multiturn filament bundle of troughs and peaks by feeding the coil winding wire onto the winding surface of the rotating arbor around spaced apart pins of alternately opposite rings of pins on the winding arbor during multiple turns of the rotating arbor and packing and holding the multiple turns of the filament bundle together on the winding surface at the troughs and peaks in the acute angles of the pins;
advancing the phase of the rotating winding arbor relative to the reciprocating wire feed winding arm and winding a second annular zig-zag winding element of a multi-turn filament bundle of peaks and troughs over the first annular zig-zag winding element and offset from the first winding element so that the troughs of the second winding element are approximately aligned with the peaks of the first winding element, by feeding the coil winding wire onto the winding surface of the rotating arbor around spaced apart pins of alternately opposite rings of pins on the winding arbor during multiple turns of the rotating arbor and packing and holding the multiple turns of the filament bundle together at the peaks and troughs in the acute angles of the pins, thereby laying the second winding element over the first winding element as adjacent multifilament bundles, rather than as individual filament crossovers and providing a first phase in the form of a ring of equivalent current loops oriented with orthogonal axes along radial directions of the annular zig-zag winding;
advancing the phase of the rotating winding arbor relative to the reciprocal wire feeding arm and winding a second phase in the form of a ring of equivalent current loops comprising third and fourth annular zig-zag winding elements wound in the same manner as the first and second zig-zag winding elements but formed around different pins offset in phase from the first and second zig-zag winding elements thereby providing a multi-phase annular zig-zag winding.

2. The method of claim 1 further comprising:
removing the pins from the winding surface of the winding arbor;
and sliding the multi-phase annular zig-zag winding from the winding arbor.

3. The method of claim 1 further comprising:
winding additional phases in the form of rings of equivalent current loops comprising offset pairs of multi-turn filament bundle annular zig-zag winding elements with opposing troughs and peaks, each ring of equivalent current loops being offset in phase on different sets of pins from adjacent rings of equivalent current loops thereby increasing the phases of the multi-phase annular zig-zag winding.

4. A method of winding an annular zig-zag winding comprising:
rotating a winding arbor having a winding surface for receiving coil forming wire in an annulus around the rotating arbor and a plurality of pins spaced apart around the arbor in at least two opposite rings of pins defining the opposite perimeters of the annular winding to be wound, said pins mounted in the winding arbor forming acute angles with the winding surface of the arbor, each ring of pins oriented with the acute angles in the direction away from the other ring of pins;

reciprocating back and forth a wire feed winding arm over the winding surface in a span greater than the spaced apart rings of pins and delivering coil winding wire to the winding surface in timed relationship to the rotation of the winding arbor;

winding a first annular zig-zag winding element of a multi-turn filament bundle of troughs and peaks by feeding the coil winding wire onto the winding surface of the rotating arbor around spaced apart pins of alternately opposite rings of pins on the winding arbor during multiple turns of the rotating arbor and packing and holding the multiple turns of the filament bundle together on the winding surface at the troughs and peaks in the acute angles of the pins;

advancing the phase of the rotating winding arbor relative to the reciprocating wire feed winding arm and winding a second annular zig-zag winding element of a multi-turn filament bundle of peaks and troughs over the first annular zig-zag winding element and offset from the first winding element so that the troughs of the second winding element are approximately aligned with the peaks of the first winding element, by feeding the coil winding wire onto the winding surface of the rotating arbor around spaced apart pins of alternately opposite rings of pins on the winding arbor during multiple turns of the rotating arbor and packing and holding the multiple turns of the filament bundle together at the peaks and troughs in the acute angles of the pins, thereby laying the second winding element over the first winding element as adjacent multifilament bundles, rather than as individual filament crossovers and providing a first phase in the form of a ring of equivalent current loops oriented with orthogonal axes along radial directions of the annular zig-zag winding.

5. The method of claim 4 further comprising:

removing the pins from the winding surface of the winding arbor;

and sliding the multi-phase annular zig-zag winding from the winding arbor.

6. The method of claim 4 further comprising:

winding additional phases in the form of rings of equivalent current loops comprising offset pairs of multi-turn filament bundle annular zig-zag winding elements with opposing troughs and peaks, each ring of equivalent current loops being offset in phase on different sets of pins from adjacent rings of equivalent current loops thereby providing a multi-phase annular zig-zag winding.

* * * * *